United States Patent
Lee (10) Patent No.: US 10,675,796 B2
(45) Date of Patent: Jun. 9, 2020

(54) METHOD AND APPARATUS FOR MANUFACTURING BATTERY PACK HAVING FIXING STRUCTURE MADE FROM THERMOPLASTIC RESIN

(71) Applicant: LG CHEM, LTD., Seoul (KR)

(72) Inventor: Bum Jick Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 268 days.

(21) Appl. No.: 15/737,998

(22) PCT Filed: Feb. 3, 2017

(86) PCT No.: PCT/KR2017/001168
§ 371 (c)(1),
(2) Date: Dec. 19, 2017

(87) PCT Pub. No.: WO2017/135718
PCT Pub. Date: Aug. 10, 2017

(65) Prior Publication Data
US 2018/0304504 A1    Oct. 25, 2018

(30) Foreign Application Priority Data
Feb. 3, 2016 (KR) .................. 10-2016-0013346

(51) Int. Cl.
*H01M 2/02* (2006.01)
*B29C 45/14* (2006.01)
(Continued)

(52) U.S. Cl.
CPC ........ *B29C 45/14* (2013.01); *B29C 45/14336* (2013.01); *B29C 45/14639* (2013.01);
(Continued)

(58) Field of Classification Search
None
See application file for complete search history.

(56) References Cited

U.S. PATENT DOCUMENTS 8,143,847 B2    3/2012  Kim
8,597,807 B2   12/2013  Lee et al.
(Continued)

FOREIGN PATENT DOCUMENTS

CN    101268570 A    9/2008
CN    102742043 A   10/2012
(Continued)

OTHER PUBLICATIONS

International Search Report (PCT/ISA/210) issued in PCT/KR2017/001168, dated Mar. 31, 2017.
(Continued)

*Primary Examiner* — Alix E Eggerding
(74) *Attorney, Agent, or Firm* — Birch, Stewart, Kolasch & Birch, LLP (57) ABSTRACT

The present invention relates to a manufacturing method of a battery pack including plate-shaped battery cells arranged on a plane so that electrode terminals thereof face each other, including: (a) a process of electrically connecting electrode terminals of battery cells to an electrode terminal connecting portion of a protection circuit board (PCB); (b) a process of mounting the battery cells connected to the PCB in a mold provided with two or more injection holes for a thermoplastic resin; (c) a process of injecting a thermoplastic resin through the injection holes to form a molding frame made of thermoplastic resin on an outer periphery of the PCB and the battery cells; and (d) a process of solidifying the molding frame.

18 Claims, 5 Drawing Sheets

(51) Int. Cl.
  *H01M 10/42* (2006.01)
  *B29C 45/27* (2006.01)
  *H01M 10/04* (2006.01)
  *H01M 10/052* (2010.01)
  *H01M 10/058* (2010.01)
  *H01M 2/10* (2006.01)
  *B29L 31/34* (2006.01)

(52) U.S. Cl.
  CPC ......... *B29C 45/27* (2013.01); *B29C 45/2708* (2013.01); *H01M 2/02* (2013.01); *H01M 2/0257* (2013.01); *H01M 2/0277* (2013.01); *H01M 2/1016* (2013.01); *H01M 10/04* (2013.01); *H01M 10/052* (2013.01); *H01M 10/058* (2013.01); *H01M 10/4257* (2013.01); *B29L 2031/3468* (2013.01)

(56) References Cited

U.S. PATENT DOCUMENTS

| | | |
|---|---|---|
| 2006/0266542 A1 | 11/2006 | Yoon |
| 2007/0069418 A1 | 3/2007 | Liao et al. |
| 2007/0154799 A1* | 7/2007 | Yoon ............... H01M 2/1005 429/176 |
| 2008/0054849 A1* | 3/2008 | Kim ................. H01M 2/0207 320/136 |
| 2010/0196651 A1 | 8/2010 | Liao et al. |
| 2010/0294344 A1 | 11/2010 | Huang |
| 2011/0268997 A1 | 11/2011 | Gaugler et al. |
| 2013/0004799 A1 | 1/2013 | Bang et al. |
| 2014/0220423 A1 | 8/2014 | Yi et al. |
| 2015/0092360 A1 | 4/2015 | Stillman et al. |
| 2015/0263389 A1 | 9/2015 | Moon |
| 2015/0380697 A1 | 12/2015 | Osborne et al. |
| 2017/0279106 A1* | 9/2017 | Takada ............... H01M 2/1066 |
| 2017/0294664 A1* | 10/2017 | Lee ................... H01M 8/04186 |

FOREIGN PATENT DOCUMENTS

| | | |
|---|---|---|
| DE | 10 2009 007 249 A1 | 7/2010 |
| EP | 3 190 653 A1 | 7/2017 |
| JP | 2004-362874 A | 12/2004 |
| JP | 2006-310298 A | 11/2006 |
| JP | 2007-165328 A | 6/2007 |
| JP | WO2011/033629 A1 | 3/2011 |
| KR | 10-2005-0059891 A | 6/2005 |
| KR | 10-2007-0108756 A | 11/2007 |
| KR | 10-2008-0020317 A | 3/2008 |
| KR | 10-2008-0048051 A | 5/2008 |
| KR | 10-2011-0016409 A | 2/2011 |
| KR | 10-2011-0110760 A | 10/2011 |
| KR | 10-1182801 B1 | 9/2012 |
| KR | 10-1255240 B1 | 4/2013 |
| KR | 10-1278978 B1 | 7/2013 |
| KR | 10-2015-0076688 A | 7/2015 |
| WO | WO 2015/050988 A1 | 4/2015 |

OTHER PUBLICATIONS

European Search Report for Appl. No. 17747763.5 dated Sep. 4, 2018.

* cited by examiner

METHOD AND APPARATUS FOR MANUFACTURING BATTERY PACK HAVING FIXING STRUCTURE MADE FROM THERMOPLASTIC RESIN

TECHNICAL FIELD

This application claims the benefit of Korean Patent Application No. 10-2016-0013346 on Feb. 3, 2016 with the Korean Intellectual Property Office, the disclosure of which is herein incorporated by reference in its entirety.

The present invention relates to a manufacturing method and apparatus of a battery pack having a fixing structure made of a thermoplastic resin.

BACKGROUND ART

As technology development and demand for mobile devices have increased, there has been a rapid increase in demand for rechargeable batteries as energy sources. Among such the rechargeable batteries, a lithium rechargeable battery with high energy density and operation potential, and a long cycle life, has been commercialized and widely used.

Since the lithium rechargeable battery contains various combustible materials, there is a danger of heat generation and explosion due to overheating, overcurrent, physical external impact, etc. Therefore, it has a serious disadvantage in safety. Thus, the lithium rechargeable battery is connected to a battery cell corresponding to a safety element such as a positive temperature coefficient (PTC) element, a protection circuit module (PCM), or the like that is capable of effectively controlling an abnormal state such as overcharging, overcurrent, etc.

Since the rechargeable battery is preferably manufactured to have a small size and light weight, a prismatic battery or a pouch-type battery having light weight compared to capacity thereof is mainly used as a battery cell of a rechargeable battery. Particularly, the pouch-type battery using an aluminum laminate sheet or the like as an exterior member has recently attracted a lot of attention due to its advantages such as light weight and low manufacturing cost.

In the pouch-type battery cell, a PCM is fixedly connected to an electrode of the battery cell in a state in which the battery cell is installed at a case thereof, a label is attached to an outer surface of the case, and thus the pouch-type battery cell is completed. For example, the case may have an assembly structure with an upper cover and a lower cover for covering an outer surface of the battery cell, or may have a separate fixing member for fixing a corner portion of the battery cell.

In addition, in order to mount the battery cell on an application product, it is generally necessary to accommodate the battery cell in a frame to protect it from external vibration or impact.

However, according to a trend of a small size and high performance of the mobile device, since a small size and high capacity of the battery pack is required, a battery pack capable of providing larger capacity at the same size is increasingly required. In addition, there is a high need for a manufacturing method of a battery pack that may reduce a manufacturing cost by simplifying a manufacturing process and improve stability against external impact.

DISCLOSURE

Technical Problem

The present invention has been made to solve the above-mentioned problems of the prior art and conventional technical problems.

The inventors of the present application have conducted intensive research and various experiments. The found that, as described later, when a battery pack including a plurality of battery cells is manufactured, since a separate assembly structure is not used by forming a molding frame made of a thermoplastic resin, it is possible to omit an assembling process of the battery pack, thereby improving processability and reducing manufacturing costs. Thus, the present invention has been accomplished.

Technical Solution

An exemplary embodiment of the present invention for these purposes provides a manufacturing method of a battery pack including plate-shaped battery cells arranged on a plane so that electrode terminals thereof face each other, including:

(a) a process of electrically connecting electrode terminals of battery cells to an electrode terminal connecting portion of a protection circuit board (PCB);

(b) a process of mounting the battery cells connected to the PCB in a mold provided with two or more injection holes for a thermoplastic resin;

(c) a process of injecting a thermoplastic resin through the injection holes to form a molding frame made of thermoplastic resin on an outer periphery of the PCB and the battery cells; and (d) a process of solidifying the molding frame.

As such, since the manufacturing method of the battery pack according to the present invention includes the forming of the molding frame made of thermoplastic resin on the outer periphery of the PCB and the battery cells, it is possible to solve a problem of requiring a separate assembly structure for assembling a conventional battery pack or for fixing it to an external device. In addition, the forming of the molding frame using thermoplastic resin may be performed in a short time, and the overall size of the battery pack may be reduced, and further, since thermoplastic resin has predetermined elasticity, the battery pack may be protected from external impact.

In a specific exemplary embodiment, considering an outer shape of the battery cell, the plate-shaped battery cell may be a pouch-type rechargeable battery or a prismatic rechargeable battery, but considering that it is assembled and fixed only with a molding frame without an additional fixing member, the plate-shaped battery cell may be a pouch-type rechargeable battery.

In the battery pack, the electrode terminals of each of two battery cells positioned on opposite sides of the PCB are connected to the electrode terminal connecting portion of the PCB, and the plate-shaped battery cells may be arranged in a planar arrangement with the electrode terminals facing each other. In this case, since the number of the battery cells may be two or more and they are preferably arranged symmetrically with respect to opposite sides of the PCB based on the PCB, the number of the battery cells may be an even number.

Since thermoplastic resin is injected through the injection hole and then moved to the outer periphery of the battery cells to form the molding frame, the thermoplastic resin must have fluidity at a relatively low temperature in order to prevent damage to the battery cells. The thermoplastic resin having such a condition may be at least one of a polyolefin-based resin, a polyvinylchloride-based resin, an ethylene-vinyl acetate (EVA) copolymer-based resin, and a silicon rubber.

On the other hand, when the number of the injection holes formed in the mold is small, since the mobility of the thermoplastic resin is reduced, a defect rate of a thickness and shape of the molding frame may increase. Therefore, it is preferable that at least one of the injection holes is formed at portions corresponding to outer edges of the battery cells and at portions corresponding to the outer peripheries of the battery cells, respectively.

In a specific exemplary embodiment, as a case that the PCB is fixed to a main body of the battery cell by the molding frame without being mounted on a separate case, an injection hole is additionally formed in a portion of the mold corresponding to the PCB, and in the process (c), a thermoplastic resin is also injected into the PCB through the injection hole, so that the PCB may be stably fixed.

In another specific exemplary embodiment, the process (b) may be performed while the PCB is mounted on the PCB case for stable fixing between the PCB and the main body of the battery cell, and the PCB case includes a lower case in which the PCB is accommodated and an upper case coupled to the lower case in a state in which the PCB is mounted therein.

The thermoplastic resin must be injected into the PCB case in order to protect the electrode terminal connected to the electrode terminal connecting portion of the PCB, and since the opposite end portions of the PCB case may be formed to have an open structure, the thermoplastic resin may move inside the PCB.

Since an external input/output terminal for electrically connecting the PCB to an external device is provided at the PCB, an opening for drawing out the external input/output terminal may be formed in a portion of the upper case or the lower case of the PCB case.

In addition, since thermoplastic resin needs to be injected not only in the open end of the PCB case but also in a central portion of the PCB case in order to fully fill the inside of the PCB case with thermoplastic resin, through-holes for injecting thermoplastic resin may be formed in the upper case and the lower case.

In this case, it is preferable that the through-holes are formed at positions corresponding to the injection holes of the thermoplastic resin formed in the mold, in order for the thermoplastic resin injected from the mold to be accurately injected into the PCB case to serve as a fixing member.

As such, for injecting thermoplastic resin into the PCB case, the number of the through-holes formed in the upper case and the lower case may be two or more.

In the case that the PCB mounted on the PCB case is mounted in the mold, in order to accurately inject thermoplastic resin injected from the mold into the PCB case, injection holes may be additionally formed in portions of the mold respectively corresponding to the open end portion and the through-hole of the PCB case.

In a specific exemplary embodiment, the molding frame may be formed to surround the outer periphery of the battery cells including the PCB, and since the molding frame is formed on the outer periphery of the battery cells and injected into the PCB or PCB case positioned between the battery cells, the battery cells and the PCB or PCB case may be fixed, and the battery pack may be fixed to the device.

In a specific exemplary embodiment, the molding frame may be formed to extend in a central direction of the battery cell while including upper and lower peripheral ends of the battery cells. As such, when the molding frame is formed to extend in the central direction of the battery cell, the battery pack may be protected from impact applied from the outer periphery of the battery cells.

According to the exemplary embodiments of the present invention, a manufacturing apparatus of the battery pack manufactured according to the above-described manufacturing method may be provided, wherein a lower mold and an upper mold coupled to each other are included therein, a structure corresponding to an external shape of the battery cells including the PCB is formed in at least one of the lower mold and the upper mold, and the injection hole through which thermoplastic resin may be injected is formed in the mold.

Generally, when the number of injection holes formed in the mold is small, thermoplastic resin is difficult to spread evenly in the mold, resulting in a high defect rate. Further, a high pressure is required when thermoplastic resin is injected, so that a shock may be applied to the battery cell during high-pressure molding.

Accordingly, the mold used in the manufacturing apparatus of the battery pack according to the present invention has a structure in which at least one injection hole is formed in each of the portions corresponding to the outer edges of the battery cells and in each of the portions corresponding to the outer peripheries of the battery cells.

For example, when the PCB is positioned between the two battery cells, one or more injection holes may be formed at each of three outer peripheries of one battery cell except that in a PCB direction thereof and at the two outer edge portions on an opposite side at which the PCB is positioned. Therefore, a moving distance of thermoplastic resin may be shortened, and thus, since thermoplastic resin may be entirely evenly distributed, it is possible to reduce the defect rate of the molding frame.

Meanwhile, since the mold may be provided with the injection hole formed at the portion corresponding to the PCB or the portion corresponding to the through-hole of the thermoplastic resin formed at the PCB case, the mounting of the PCB on the battery cell may be more stably performed.

In addition, the molding frame may be formed to extend in the central direction of the battery cell via the upper and lower peripheral ends of the battery cells including the PCB, so that for forming the molding frame, the mold may have an inclined structure so that the molding frame extending from the upper and lower peripheral ends of the battery cells to the center of the battery cell may be formed.

The present invention also provides a battery pack manufactured by the above-described methods, and a device including the battery pack as a power source.

Advantageous Effects

Specifically, the battery pack may be used as a power source for devices requiring high-temperature safety, long cycle characteristics, and high rate characteristics. Specific examples of such devices include mobile electronic devices; power tools powered by a battery-based motor; electric vehicles including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system, but the present invention is not limited thereto.

The structures of these devices and the manufacturing methods thereof are well known in the art, so a detailed description thereof will be omitted herein.

MODE FOR INVENTION

Hereinafter, an exemplary embodiment of the present invention is described with reference to the drawings, and is provided for easy understanding of the present invention, but the scope of the present invention is not limited thereto.

Figure 1:
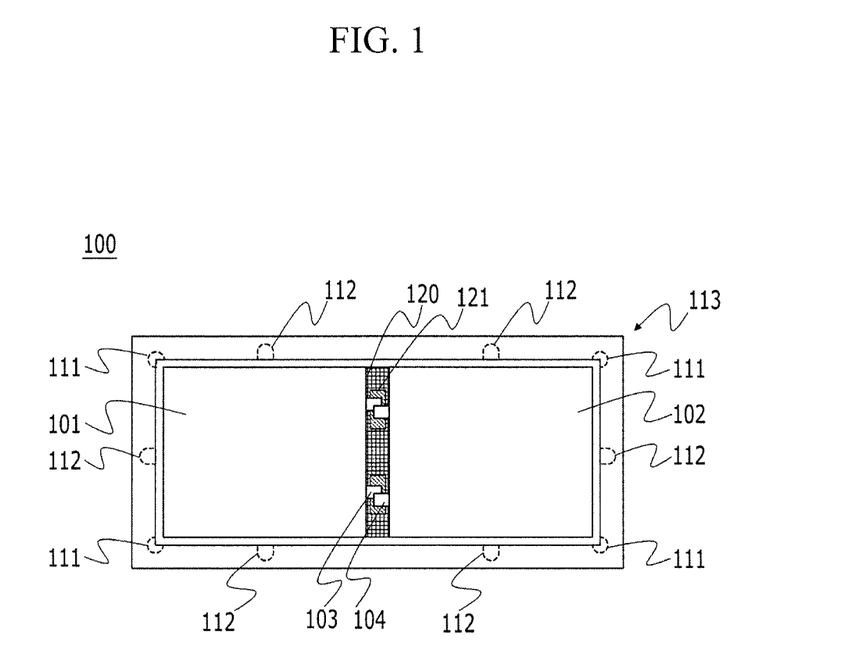
FIG. 1 illustrates a top plan view of battery cells connected to a PCB mounted on a mold according to an exemplary embodiment.
Figure 2:
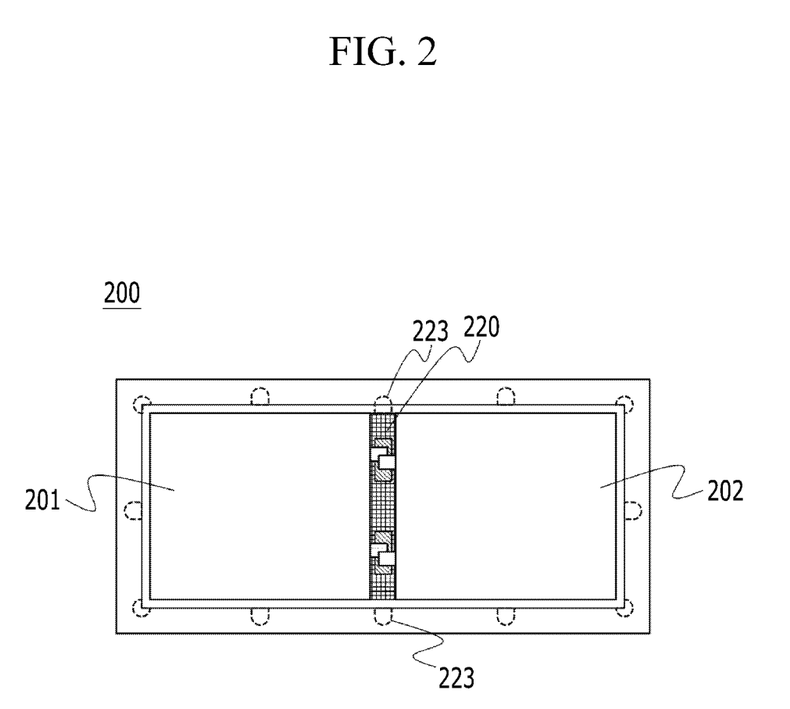
FIG. 2 illustrates a top plan view of battery cells connected to a PCB mounted on a mold according to another exemplary embodiment.

FIG. 1 and FIG. 2 schematically illustrate a top plan view of a state in which battery cells connected to a PCB are mounted on a mold used in a manufacturing method of a battery pack of the present invention. Referring to FIG. 1 and FIG. 2, plate-shaped battery cells 101 and 102 disposed at opposite sides of a mold 100 with a PCB 120 therebetween are mounted on the mold 100 in a planar arrangement. Electrode terminals 103 and 104 of the battery cells 101 and 102 are connected to an electrode terminal connecting portion 121 of the PCB, and the PCB is connected to the battery cells through the electrode terminal connecting portion without a separate member.

A plurality of injection holes 111 and 112 for injecting thermoplastic resin are formed in the mold 100, so that the injection holes 112 are formed at portions corresponding to the outer peripheries of the battery cells, and the injection holes 111 are formed at portions corresponding to outer edges 113 of the battery cells. FIG. 1 shows one injection hole at each of the outer peripheries of the battery cells, but two or more injection holes may be formed at each of the outer peripheries.

Although a structure and a method in which the electrode terminals of the battery cells 101 and 102 are connected to the electrode terminal connecting portion of the PCB are not specified in this specification, it is possible to use battery cells having electrode terminals of different directions or to arrange and design battery cells in various ways so that the electrodes of the electrode terminals connected to one electrode terminal connection portion may have the same structure.

FIG. 2 shows a state in which two battery cells 201 and 202 disposed on opposite sides of a PCB 220 are mounted on a mold 200 while being connected to the PCB, and when compared with the mold 100 of FIG. 1, there is a difference in that injection holes 223 are additionally formed in portions corresponding to the PCB 220. As such, when the injection holes are additionally formed in the portions corresponding to the PCB, it is possible to stably connect the PCB and the battery cells by moving thermoplastic resin to a central portion of the PCB.

Figure 3:
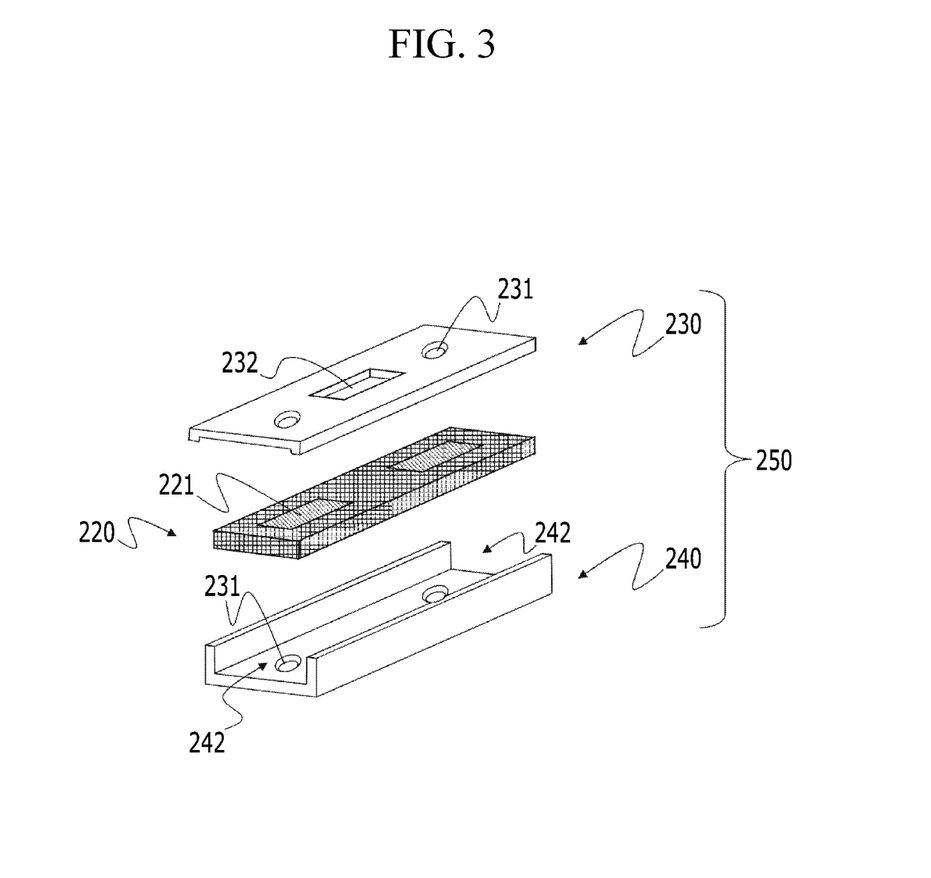
FIG. 3 illustrates an exploded perspective view of a PCB mounted on a PCB case.

FIG. 3 schematically shows an exploded perspective view of a state in which the PCB 220 is accommodated in a PCB case including an upper case 230 and a lower case 240.

Referring to FIG. 3, a PCB case 250 is configured of the upper case 230 positioned on an upper surface of the PCB 220 and the lower case 240 positioned on a lower surface of the PCB 220, and opposite ends of the PCB case 250 are provided with open structures 242 so as to inject thermoplastic resin into the PCB case.

The PCB including the electrode terminal connecting portion may be mounted in the mold in a state in which the PCB is mounted on the PCB case while the electrode terminals are coupled to an electrode terminal connecting portion 221, so that the upper case 230 is formed with an opening 232 for drawing out an external input/output terminal (not shown) connected to the electrode terminal connecting portion 221, and two through-holes 231 for injecting the thermoplastic resin are formed in each of the upper case 230 and the lower case 240.

Figure 4:
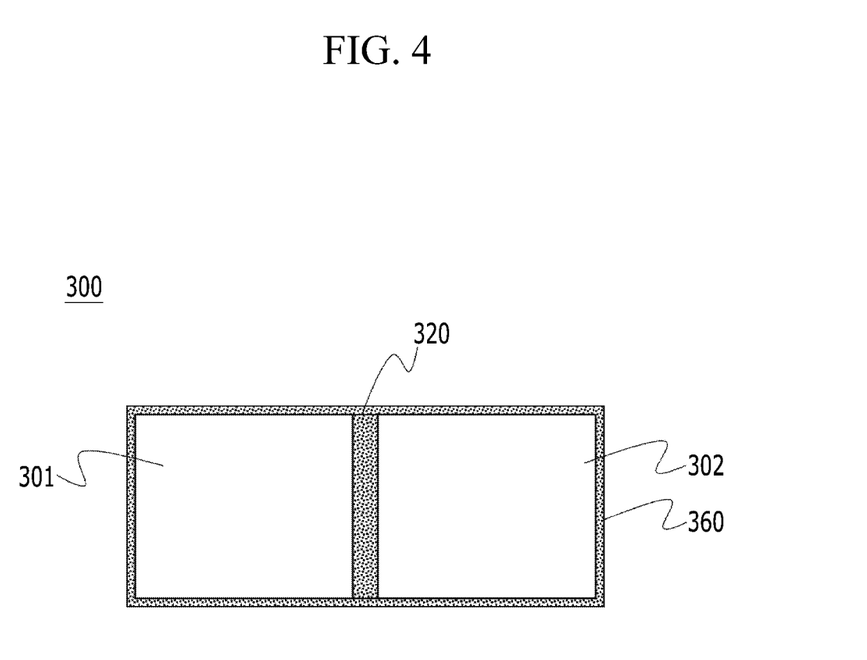
FIG. 4 illustrates a top plan view of a battery pack provided with a molding frame according to an exemplary embodiment.
Figure 5:
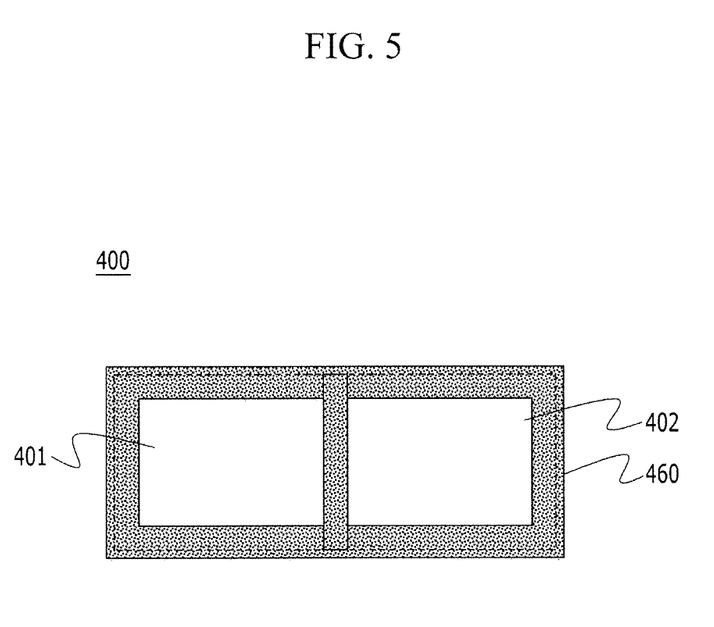
FIG. 5 illustrates a top plan view of a battery pack provided with a molding frame according to another exemplary embodiment.

FIG. 4 and FIG. 5 show top plan views of a battery pack formed with a molding frame.

Referring to FIG. 4 and FIG. 5, a battery pack 300 includes a molding frame 360 formed at outer peripheries of two battery cells 301 and 302 connected to a PCB or a PCB case 320. The molding frame 360 is formed to be able to stably fix the electrode terminal connected to the electrode terminal connecting portion of the PCB and to be able to stably mount the PCB on the battery cell, so that the molding frame may be formed to have a frame structure having a predetermined thickness so as to be connected to the battery cell while surrounding the upper and lower surfaces of the PCB, or the thermoplastic resin may surround the outer periphery of the PCB case and be fully injected into a space inside the PCB case.

Like the battery pack 300, a battery pack 400 includes a molding frame 460 formed to surround outer peripheral ends of upper and lower surfaces of battery cells 401 and 402, and further, it extends from the outer peripheral ends of the upper and lower surfaces of the battery cells toward a central portion of the battery cells. As such, when the molding frame is formed to extend in a central direction of the battery cells, the battery cells and the PCB may be stably fixed, and the portion at which the molding frame is formed may reduce external impact, thereby protecting the battery pack from impact.

It will be understood by those skilled in the art that various changes in form and details may be made therein without departing from the spirit and scope of the invention as defined by the appended claims.

As described above, since the manufacturing method and apparatus of the battery pack according to the present invention does not use a separate assembling structure for the battery pack including a plurality of battery cells, it is possible to omit some of assembly processes of a battery pack and provide a battery pack of a high capacity.

In addition, since the molding frame made of a thermoplastic resin is formed, it is possible to reduce external impact, and thus, to improve safety of the battery pack.

The invention claimed is:

1. A manufacturing method of a battery pack including plate-shaped battery cells arranged on a plane so that electrode terminals thereof face each other, comprising:
    (a) a process of electrically connecting electrode terminals of battery cells to an electrode terminal connecting portion of a protection circuit board (PCB);
    (b) a process of mounting the battery cells connected to the PCB in a mold provided with two or more injection holes for a thermoplastic resin in a state in which the PCB is mounted in a PCB case, the PCB case including a lower case in which the PCB is accommodated and an upper case coupled to the lower case when in the state in which the PCB is mounted therein;
    (c) a process of injecting a thermoplastic resin through the injection holes to form a molding frame made of thermoplastic resin on an outer periphery of the PCB and the battery cells, and into the PCB case simultaneously; and (d) a process of solidifying the molding frame, wherein opposite end portions of the PCB case are opened.

2. The manufacturing method of the battery pack of claim 1, wherein the plate-shaped battery cell is a pouch-type rechargeable battery or a prismatic rechargeable battery.

3. The manufacturing method of the battery pack of claim 1, wherein two plate-shaped battery cells are arranged on a plane in a state in which the electrode terminals face each other.

4. The manufacturing method of the battery pack of claim 1, wherein the thermoplastic resin is at least one of a polyolefin-based resin, a polyvinylchloride-based resin, an ethylene-vinyl acetate copolymer-based (EVA) resin, and a silicon rubber.

5. The manufacturing method of the battery pack of claim 1, wherein at least one of the injection holes formed in the mold is formed at portions corresponding to outer edges of the battery cells and at portions corresponding to the outer peripheries of the battery cells, respectively.

6. The manufacturing method of the battery pack of claim 1, wherein an injection hole is additionally formed in a portion of the mold corresponding to the PCB, and in the process (c), the thermoplastic resin is injected into the PCB through the injection hole.

7. The manufacturing method of the battery pack of claim 1, wherein an opening for drawing out an external input/output terminal is formed in the PCB case.

8. The manufacturing method of the battery pack of claim 1, wherein through-holes for injecting thermoplastic resin are formed in the upper case and the lower case.

9. The manufacturing method of the battery pack of claim 8, wherein the through-hole is formed at a position corresponding to the injection hole of thermoplastic resin formed in the mold.

10. The manufacturing method of the battery pack of claim 8, wherein the number of through-holes is two or more.

11. The manufacturing method of the battery pack of claim 1, wherein injection holes are additionally formed in portions of the mold respectively corresponding to the opened end portion and the through-hole of the PCB case.

12. The manufacturing method of the battery pack of claim 1, wherein the molding frame is formed to surround an outer periphery of the battery cells including the PCB.

13. The manufacturing method of the battery pack of claim 1, wherein the molding frame is formed to extend in a central direction of the battery cells via upper and lower peripheral ends of the battery cells.

14. A manufacturing apparatus of the battery pack of claim 1, comprising
    a lower mold and an upper mold to be coupled to each other,
    wherein a structure corresponding to an outer shape of battery cells including a PCB is formed in at least one of the lower mold and the upper mold, and
    injection holes configured to inject a thermoplastic resin are formed in the mold.

15. The manufacturing apparatus of the battery pack of claim 14, wherein the mold has a structure in which at least one injection hole is formed in each of portions corresponding to outer edges of the battery cells and in each of portions corresponding to outer peripheries of the battery cells.

16. The manufacturing apparatus of the battery pack of claim 14, wherein the mold is provided with an injection hole formed at a portion corresponding to the PCB or a portion corresponding to a through-hole of a thermoplastic resin formed at a PCB case.

17. A battery pack manufactured by the manufacturing method of the battery pack of claim 1.

18. A device comprising the battery pack of claim 17 as a power source.

* * * * *